United States Patent
Wu et al.

[11] Patent Number: 6,139,950
[45] Date of Patent: Oct. 31, 2000

[54] MAGNETIC RECORDING MEDIUM CONTAINING A CR(HFO$_2$) OR CR(ZRO$_2$)

[75] Inventors: Zhong Wu, Fremont; Rajiv Y. Ranjan, San Jose, both of Calif.

[73] Assignee: Seagate Technology LLC, Scotts Valley, Calif.

[21] Appl. No.: 09/160,580

[22] Filed: Sep. 25, 1998

Related U.S. Application Data

[60] Provisional application No. 60/088,120, Jun. 4, 1998.

[51] Int. Cl.$^7$ ......................................................... G11B 5/66

[52] U.S. Cl. ...................... 428/332; 428/336; 428/694 T; 428/694 TS; 428/694 ST; 428/900

[58] Field of Search .......................... 428/694 T, 694 TS, 428/694 ST, 900, 336, 332

[56] References Cited

U.S. PATENT DOCUMENTS

| | | | |
|---|---|---|---|
| 4,828,905 | 5/1989 | Wada | 428/213 |
| 4,898,774 | 2/1990 | Yamashita | 428/336 |
| 5,456,978 | 10/1995 | Lal | 428/332 |
| 5,700,593 | 12/1997 | Okumura | 428/694 TS |
| 5,800,931 | 9/1998 | Lee | 428/611 |
| 5,939,202 | 8/1999 | Ataka | 428/457 |
| 5,985,673 | 11/1999 | Xiong | 428/65.3 |

*Primary Examiner*—Leszek Kiliman
*Attorney, Agent, or Firm*—McDermott, Will & Emery

[57] ABSTRACT

The Hr and SNR of a magnetic recording medium are increased by employing an underlayer containing Cr or a Cr alloy with HfO$_2$ or ZrO$_2$ dispersed therein. Embodiments include a composite underlayer comprising a first Cr or Cr alloy underlayer containing about 0.1 to about 20 at. % dispersed HfO$_2$ or ZrO$_2$ and a second underlayer comprising Cr or a Cr alloy, e.g. CrV, thereon.

16 Claims, 2 Drawing Sheets

6,139,950

MAGNETIC RECORDING MEDIUM CONTAINING A CR(HFO₂) OR CR(ZRO₂)

RELATED APPLICATIONS

This application claims priority from Provisional Application Ser. No. 60/088,120, filed Jun. 4, 1998 entitled "NOVEL UNDERLAYER DESIGN CONTAINING METAL OXIDES FOR MAGNETIC RECORDING MEDIA", the entire disclosure of which is hereby incorporated herein by reference.

This application contains subject matter similar to subject matter disclosed in U.S. patent applications Ser. No. 09/159,629, filed on Sep. 24, 1998, now pending and Ser. No. 09/160,579 filed on Sep. 25, 1998, now pending

TECHNICAL FIELD

The present invention relates to magnetic recording media, such as thin film magnetic recording disks. The present invention has particular applicability to high areal density magnetic recording media exhibiting low noise and high remanent coercivity.

BACKGROUND ART

The requirement for increasingly high areal recording density imposes increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. Efforts to produce a magnetic recording medium satisfying such demanding requirements confront significant challenges.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an aluminum (Al)-alloy, such as an Al-magnesium (AlMg) alloy, plated with a layer of amorphous nickel-phosphorus (NiP). Alternative substrates include glass, ceramic and glass-ceramic materials, plastics, silicon, as well as graphite. There are typically sequentially sputter deposited on each side of substrate 10 an adhesion enhancement layer 11, 11', e.g., chromium (Cr) or a Cr alloy, a seedlayer 12, 12', such as NiP, an underlayer 13, 13', such as Cr or a Cr alloy, a magnetic layer 14, 14', such as a cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for epitaxially growing fine grains of hexagonal close packed (HCP) Co alloys deposited thereon.

As the demand for high areal recording density increases, the requirements for high recording signal, low media noise and narrow transitions become increasingly difficult to simultaneously satisfy, thereby imposing great demands on film structure design and fabrication techniques. Thus, efforts have been made to explore new types of magnetic and underlayer materials, design new multi-layer thin film structures and manipulate various thin film deposition parameters in attempting to improve magnetic properties and information read/write processes. However, there remains a need for increasingly high areal recording density magnetic recording media exhibiting a Hr and high SNR.

DISCLOSURE OF THE INVENTION

An advantage of the present invention is a high areal recording density magnetic recording medium exhibiting low medium noise and high Hr.

Additional advantages and other features of the present invention will be set forth in part in the description which follows and in part will become apparent to those having ordinary skill in the art upon examination of the following only to be learned from the practice of the present invention. The objects and advantages of the present invention may be realized and obtained as particularly pointed out in the appended claims.

According to the present invention, the foregoing and other advantages are achieved in part by a magnetic recording medium comprising: a non-magnetic substrate; a first underlayer comprising chromium (Cr) or a Cr alloy, containing hafnium oxide ($HfO_2$) or zirconium oxide ($ZrO_2$) dispersed therein; and a magnetic layer.

Another aspect of the present invention is a magnetic recording medium comprising: a glass, ceramic or glass-ceramic substrate, a first underlayer on the substrate, the first underlayer comprising Cr or a Cr alloy, containing $HfO_2$ or $ZrO_2$ dispersed therein; a second underlayer on the first underlayer, the second underlayer containing Cr or a Cr alloy; and a magnetic layer on the second underlayer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

Figure 1:
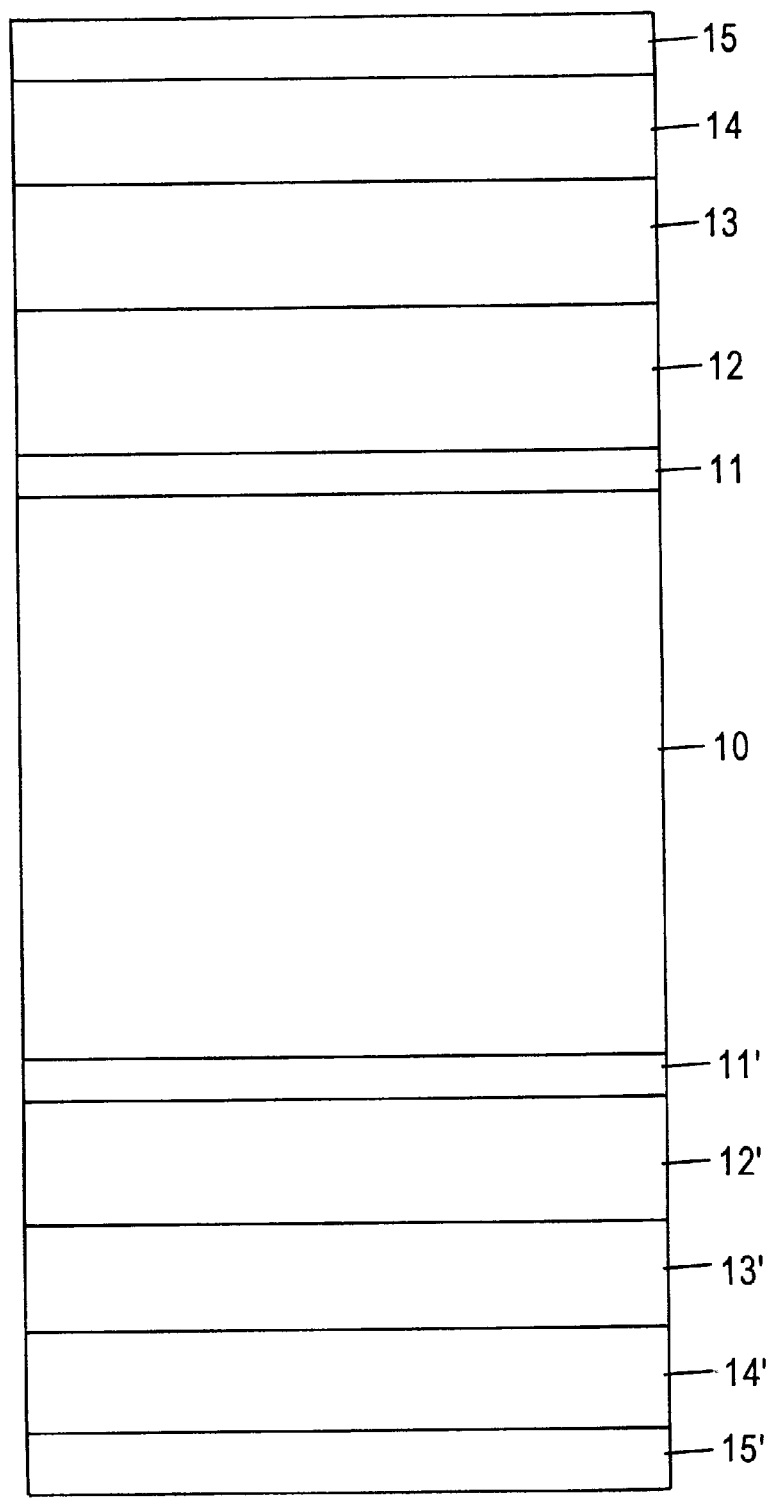
FIG. 1 schematically depicts a conventional magnetic recording medium structure.

The present invention provides magnetic recording media suitable for high areal recording density exhibiting high Hr and high SNR. In embodiments of the present invention, the objectives of high areal recording density, high Hr and high SNR are achieved by the strategic formation of an underlayer comprising Cr or a Cr alloy containing hafnium oxide (HfO$_2$) or zirconium oxide (ZrO$_2$) dispersed within the Cr or Cr alloy, particularly at the grain boundaries.

Embodiments of the present invention comprise sputter depositing, as by RF or DC magnetron sputtering, the first underlayer from a target containing Cr or a Cr alloy layer having HfO$_2$ or ZrO$_2$ dispersed therein at the grain boundaries and fabricated by hot isostatic compaction. Such sputtering targets typically comprise highly homogeneous grains having a fine grain size. Particularly advantageous results have been achieved employing a double underlayer structure comprising a first underlayer of Cr or a Cr alloy having HfO$_2$ or ZrO$_2$ dispersed therein, and a second underlayer comprising Cr or a Cr alloy layer on the first underlayer. The first underlayer can contain HfO$_2$ or ZrO$_2$ in an amount of about 0.1 to about 20 at. %, e.g. about 1 to about 5 at. %. The Cr alloys employed for the first and/or second underlayers can comprise Cr and an alloying element such as vanadium (V), manganese (Mn), molybdenum (Mo), titanium (Ti), zirconium (Zr) or copper (Cu) typically in an amount of about 0.1 to about 50 at. %.

The present invention can be implemented employing a non-magnetic substrate, such as any of the non-magnetic substrates conventionally employed in the manufacture of magnetic recording media, e.g. Al, Al alloys such as AlMg, NiP plated Al or Al alloys, or alternative substrates, such as glass, glass-ceramic and ceramic materials. Particularly advantageous results have been achieved employing glass substrates.

Magnetic recording media in accordance with the present invention can comprise a magnetic layer containing any magnetic material conventionally employed in the manufacture of magnetic recording media, such as a Co alloy, e.g. Co-Cr-tantalum (Ta) alloys, Co-Cr-platinum (Pt) alloys, CoCrNi alloys, or CoCrPtTa alloys.

In various embodiments of the present invention the first underlayer can be deposited at a thickness of about 10 Å to about 1000 Å, e.g. about 200 Å to about 600 Å. Advantageously, the first and second underlayers can be deposited at the same thickness, typically about 10 Å to about 1000 Å, e.g. about 200 Å to about 600 Å.

The use of an underlayer structure, particularly double underlayer structure containing a first underlayer of Cr or a Cr alloy layer having HfO$_2$ or ZrO$_2$ dispersed therein, particularly at the grain boundaries, and a second underlayer of Cr or a Cr alloy layer, particularly a Cr alloy such as CrV$_{20}$, yields particularly advantageously high Hr and low medium noise. Advantageously, conventional manufacturing techniques and production equipment can be employed to produce the magnetic recording media in accordance with the present invention. For example, the underlayer can be sputter deposited on a smooth glass substrate in a DC magnetron sputtering apparatus while maintaining the base pressure below $10^{-7}$ Torr., heating the substrate at a temperature in excess of 100° C. and maintaining the sputtering pressure at about 5 to about 15 mTorr. Magnetic layers can be epitaxially grown on the second underlayer.

Figure 2:
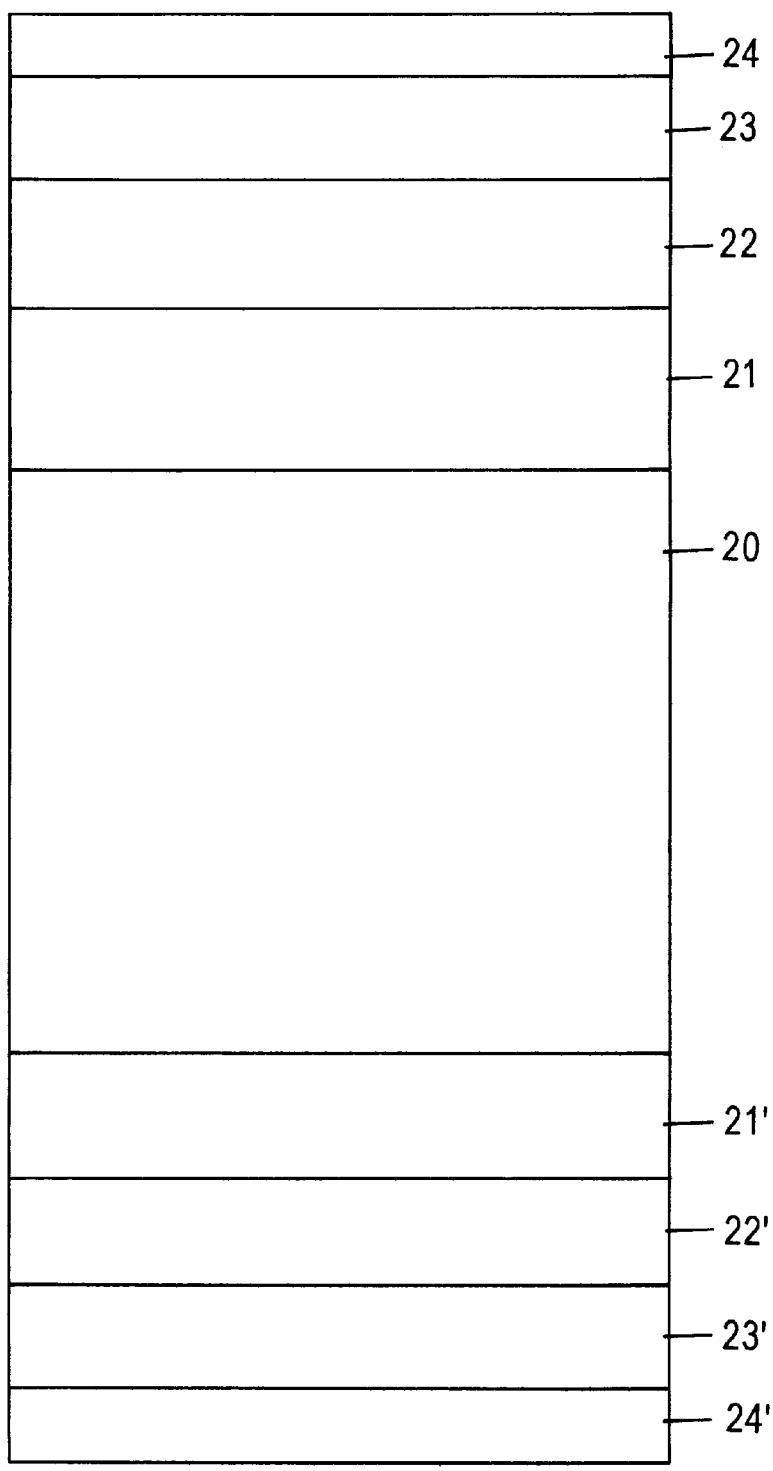
FIG. 2 schematically depicts a magnetic recording medium structure in accordance with an embodiment of the present invention.

An embodiment of the present invention is schematically illustrated in FIG. 2 and comprises substrate 20, such as a glass, ceramic or glass-ceramic material. There are sequentially sputter deposited on each side of substrate 20 first underlayer 21, 21' comprising Cr or a Cr alloy having HfO$_2$ or ZrO$_2$ dispersed therein, a second underlayer 22, 22' comprising Cr or a Cr alloy, e.g. CrV$_{20}$, a magnetic alloy layer 23, 23', and a protective overcoat 24, 24' such as a carbon-containing protective overcoat. Although not shown for illustrative convenience, a lubricant topcoat is applied on the protective overcoat 24, 24'.

The present invention enables the epitaxial growth of a magnetic Co-alloy having a preferred HCP crystal structure with the easy magnetic c-axis in the film plane with an attendant improvement in recording performance. The underlayer structure of the present invention enables the manufacture of magnetic recording media having a significantly higher coercivity attributed to the well segregated grains and decreased exchange and magnetostatic coupling, resulting in a shorter data bit length and magnetic transition length.

The exact mechanism underpinning improvement in magnetic properties achieved by employing an underlayer containing Cr or a Cr alloy with HfO$_2$ or ZrO$_2$ dispersed therein is not known with certainty. However, it is believed that the improvement can be attributed to several possible mechanisms, such as decreased grain size of the underlayer material by virtue of the dispersed HfO$_2$ or ZrO$_2$ therein, particularly at the grain boundaries. By reducing the grain size of the underlayer, the grain size of the magnetic film epitaxially grown thereon is reduced, thereby providing stronger segregation at grain boundaries and, hence, reduced magnetic exchange and magnetostatic interactions, superior lattice matching and, hence, better epitaxial growth and a higher degree of crystallinity and magnetic easy axis orientation.

The present invention can be employed to produce any of various types of magnetic recording media, including thin film disks. The present invention is particularly applicable in producing a high areal recording density magnetic recording media requiring a low flying height and exhibiting a high Hr and a high SNR.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:
    a non-magnetic substrate;
    a first underlayer comprising chromium (Cr) or a Cr alloy, containing hafnium oxide (HfO$_2$) or zirconium oxide (ZrO$_2$) dispersed therein; and
    a magnetic layer.

2. The magnetic recording medium according to claim 1, wherein the HfO$_2$ or ZrO$_2$ is dispersed primarily at grain boundaries of the Cr or Cr alloy.

3. The magnetic recording medium according to claim 1, wherein the first Cr or Cr alloy underlayer contains about 0.1 to about 20 at. % HfO$_2$ or ZrO$_2$.

4. The magnetic recording medium according to claim 3, wherein the first Cr or Cr alloy underlayer contains about 1 to about 5 at. % HfO$_2$ or ZrO$_2$.

5. The magnetic recording medium according to claim 4, further comprising a second underlayer on the first underlayer, and the magnetic layer on the second underlayer.

6. The magnetic recording medium according to claim 5, wherein the second underlayer comprises Cr or a Cr alloy.

7. The magnetic recording medium according to claim 6, wherein the Cr alloy of the first and/or second underlayer comprises about 0.1 to about 50 at. % vanadium, manganese, molybdenum, titanium, zirconium or copper.

8. The magnetic recording medium according to claim 5, wherein the second underlayer comprises an alloy of Cr and vanadium.

9. The magnetic recording medium according to claim 1, wherein the magnetic layer comprises a cobalt alloy.

10. The magnetic recording medium according to claim 1, wherein the sputtering target for growing the first underlayer layer is produced by hot isostatic compaction.

11. The magnetic recording medium according to claim 1, wherein the first underlayer has a thickness of about 10 Å to about 1000 Å.

12. The magnetic recording medium according to claim 11, wherein the first underlayer has a thickness of about 200 Å to about 600 Å.

13. The magnetic recording medium according to claim 5, wherein each of the first and second underlayers has a thickness of about 10 Å to about 1000 Å.

14. The magnetic recording medium according to claim 13, wherein each of the first and second underlayers has a thickness of about 200 Å to about 600 Å.

15. The magnetic recording medium according to claim 1, wherein the non-magnetic substrate comprises a glass, ceramic or glass-ceramic material on aluminum or an aluminum alloy.

16. The magnetic recording medium according to claim 15, wherein the non-magnetic substrate comprises a glass material.

* * * * *